US012804322B2

(12) United States Patent
Tanase et al.

(10) Patent No.: US 12,804,322 B2
(45) Date of Patent: Nov. 17, 2026

(54) AUDIO PLAYBACK METHOD AND DEVICE

(71) Applicant: NXP USA, Inc., Austin, TX (US)

(72) Inventors: Cristian Alexandru Tanase, Bucharest (RO); Alexandru Porosanu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 224 days.

(21) Appl. No.: 18/764,862

(22) Filed: Jul. 5, 2024

(65) Prior Publication Data

US 2025/0039605 A1 Jan. 30, 2025

(30) Foreign Application Priority Data

Jul. 24, 2023 (RO) .............................. a 2023 00395

(51) Int. Cl.
*H04R 3/12* (2006.01)
*G06F 3/16* (2006.01)
(Continued)

(52) U.S. Cl.
CPC ............... *H04R 3/12* (2013.01); *G06F 3/162* (2013.01); *H04R 29/002* (2013.01); *H04W 36/035* (2023.05); *H04W 36/304* (2023.05); *H04W 36/322* (2023.05); *H04R 2420/01* (2013.01); *H04R 2420/07* (2013.01)

(58) Field of Classification Search
CPC .... H04R 3/12; H04R 29/002; H04R 2420/01; H04R 2420/07; H04W 36/035; H04W 36/304; H04W 36/322; H04W 4/80; H04W 36/185; H04W 84/18; H04W 36/1446; H04W 76/10; H04W 76/14; G06F 3/162; H04M 1/6066; H04M 1/05; H04N 21/43076
See application file for complete search history.

(56) References Cited

U.S. PATENT DOCUMENTS

| | | | | |
|---|---|---|---|---|
| 9,961,669 B2 | 5/2018 | Chapelot et al. | | |
| 2016/0112839 A1* | 4/2016 | Choi | H04W 4/80 455/41.2 | |

(Continued)

FOREIGN PATENT DOCUMENTS

| | | |
|---|---|---|
| CN | 112399396 B | 6/2021 |
| EP | 2934030 A1 | 10/2015 |

(Continued)

*Primary Examiner* — Yogeshkumar Patel

(57) ABSTRACT

An audio playback method for a Bluetooth low energy (BLE) system is described. The BLE system includes at least two BLE audio playback devices configured to be bonded to a BLE audio source device having two BLE transceivers. A first BLE audio playback device of the plurality of BLE audio playback devices may initially have an active connection to the BLE audio source device. The method includes sending audio data from the BLE audio source device to the first BLE audio playback device. A metric of an active connection signal and a bonded connection signal is determined. The method determines whether a second BLE audio playback device is a better candidate for audio playback than the first BLE audio playback device depending on at least the bonded connection signal metric. If it is a better candidate, the active connection is handed over to the second BLE audio playback device.

20 Claims, 5 Drawing Sheets

(51) Int. Cl.

| | |
|---|---|
| ***H04R 29/00*** | (2006.01) |
| ***H04W 36/00*** | (2009.01) |
| ***H04W 36/30*** | (2009.01) |
| ***H04W 36/32*** | (2009.01) |

(56) References Cited

U.S. PATENT DOCUMENTS

| | | | | |
|---|---|---|---|---|
| 2018/0091965 | A1 | 3/2018 | Watson et al. | |
| 2018/0115858 | A1 | 4/2018 | Raghavendra | |
| 2022/0078219 | A1 * | 3/2022 | D'Amato | H04L 65/611 |
| 2024/0397399 | A1 * | 11/2024 | Gupta | H04W 36/322 |

FOREIGN PATENT DOCUMENTS

| | | | | |
|---|---|---|---|---|
| EP | 3420759 | B1 | 4/2020 | |
| WO | WO-2023069144 | A1 * | 4/2023 | H04W 36/322 |

* cited by examiner

150

250

AUDIO PLAYBACK METHOD AND DEVICE

CROSS-REFERENCE TO RELATED APPLICATIONS

This application claims the priority under 35 U.S.C. § 119 of Romania application no. A202300395, filed on 24 Jul. 2023, the contents of which are incorporated by reference herein.

FIELD

This disclosure relates to an audio playback method and device for Bluetooth Low Energy (BLE) systems.

BACKGROUND

Bluetooth low energy is a wireless personal area network which is part of the Bluetooth specification. The Bluetooth LE Audio specification standardizes audio transmission with BLE Systems. Such Bluetooth Low Energy systems allow a single BLE audio source device to transmit audio streams to multiple BLE audio receiver devices such as BLE loudspeakers or headphones. Conversely a single BLE audio receiver device may be connected to multiple audio source devices.

SUMMARY

Aspects of the disclosure are defined in the accompanying claims. In a first aspect, there is defined An audio playback method for a Bluetooth low energy, BLE, system comprising a BLE audio source device having at least two BLE transceivers, a plurality of BLE audio playback devices configured to be bonded to the BLE audio source device, a first BLE audio playback device of the plurality of BLE audio playback devices configured to initially have an active connection to the BLE audio source device, the method comprising: sending audio data from the BLE audio source device to the first BLE audio playback device; determining a metric of an active connection signal transmitted from the first BLE audio playback device to the BLE audio source device; determining a metric of a bonded connection signal transmitted from a second BLE audio playback device of the plurality of BLE audio playback devices to the BLE audio source device; determining whether to handover the active connection to the second BLE audio playback device depending on at least the bonded connection signal metric; and in response to determining to handover the active connection to the second BLE audio playback: handing over the active connection to the second BLE audio playback device by: initiating a connection request to the second BLE audio playback device; sending audio data to the second BLE audio playback device while simultaneously sending data to the first BLE audio playback device; and, in response to a connection complete status, stopping sending audio data to the first BLE audio playback device.

In some embodiments, the BLE audio source device is configured as a scanner, the first and second BLE audio playback devices are configured to transmit advertiser, ADV, packets, and wherein the method further comprises: receiving the ADV packets by the BLE audio source device from the first and second BLE audio playback devices; and determining the active connection signal metric and the bonded connection signal metric from the ADV packets.

In some embodiments, determining the active connection signal metric and the bonded connection signal metric comprises determining a received signal strength indication (RSSI) of the respective connection.

In some embodiments, determining whether to handover the active connection to the second BLE audio playback device further comprises: comparing a bonded connection RSSI to a RSSI proximity threshold value; and determining that the second BLE audio playback device is a better candidate for audio playback than the first BLE audio playback device if the bonded connection RSSI is above the RSSI proximity threshold value.

In some embodiments, determining the active connection signal metric and the bonded connection signal metric comprises determining a time-of-flight (ToF) of the respective connection signal.

In some embodiments, determining whether to handover the active connection to the second BLE audio playback device further comprises: comparing a bonded connection time-of-flight, ToF, to a ToF proximity threshold value; and determining that the second BLE audio playback device is a better candidate for audio playback than the first BLE audio playback device if the bonded connection ToF is less than the ToF proximity threshold value.

In some embodiments, determining the active connection signal metric and the bonded connection signal metric comprises determining an angle-of-arrival of the respective connection signal.

In some embodiments, determining whether to handover the active connection to the second BLE audio playback device further comprises: detecting a change in the angle-of-arrival of the bonded connection signal in response to at least one of the bonded signal RSSI being less than a RSSI proximity threshold value and the bonded signal ToF being greater than a ToF proximity threshold value.

In some embodiments, determining whether to handover the active connection to the second BLE audio playback device further comprises: comparing the bonded connection signal RSSI with the active connection signal RSSI.

In some embodiments, determining whether to handover the active connection to the second BLE audio playback device further comprises: comparing the bonded connection signal ToF with the active connection signal ToF.

In some embodiments, determining the active connection signal metric and the bonded connection signal metric comprises determining a signal-to-noise ratio, SNR, of the respective connection signal.

In a second aspect, there is defined a Bluetooth low energy, BLE, audio source device comprising two BLE transceivers and configured to be bonded to a plurality BLE audio playback devices, and to initially have an active connection to a first BLE audio playback device of a plurality of BLE audio playback, BLE audio source device configured to: send audio data to the first BLE audio playback device; determine a metric of an active connection signal received from the first BLE audio playback device; determine a metric of a bonded connection signal received from a second BLE audio playback device of the plurality of BLE audio playback devices; determine whether to handover the active connection to the second BLE audio playback device depending on at least the bonded connection signal metric; and in response to determining to handover the active connection to the second BLE audio playback device, the BLE audio source device is further configured to hand over the active connection to the second BLE audio playback device by: initiating a connection request to the second BLE audio playback device; and sending audio data to the second BLE audio playback device while simultaneously sending data to the first audio device; and in response to a connection complete signal, stopping sending audio data to the first BLE audio playback device.

In some embodiments, the BLE audio source device is configured to: receive advertiser (ADV) packets from the first and second BLE audio playback devices; and determine the active connection signal metric and the bonded connection signal metric from the ADV packets.

In some embodiments, the active connection signal metric and the bonded connection signal metric comprises at least one of a received signal strength indication, RSSI, a time-of-flight, ToF, an angle-of-arrival, and a signal to noise ratio, SNR, of the respective connection signal.

In some embodiments, the BLE audio source device is configured to determine whether to handover the active connection to the second BLE audio playback device by: comparing a bonded connection RSSI to a RSSI proximity threshold value; and further configured to determine that the second BLE audio playback device is a better candidate for audio playback than the first BLE audio playback device if the bonded connection RSSI is above the RSSI proximity threshold value.

In some embodiments, the BLE audio source device is configured to determine whether to handover the active connection to the second BLE audio playback device by: comparing a bonded connection time-of-flight, ToF, to a ToF proximity threshold value; and further configured to determine that the second BLE audio playback device is a better candidate for audio playback than the first BLE audio playback device if the bonded connection ToF is less than the ToF proximity threshold value.

In some embodiments, the BLE audio source device is configured to determine whether to handover the active connection to the second BLE audio playback device by: detecting a change in the angle-of-arrival of the bonded connection signal in response to at least one of a bonded connection signal RSSI being less than a RSSI proximity threshold value and a bonded connection signal ToF being greater than a ToF proximity threshold value.

In some embodiments, the BLE audio source device is configured to determine whether to handover the active connection to the second BLE audio playback device by: comparing a bonded connection signal RSSI with an active connection signal RSSI.

In some embodiments, the BLE audio source device is configured to determine whether to handover the active connection to the second BLE audio playback device by: comparing a bonded connection signal ToF with an active connection signal ToF.

A BLE audio system may include embodiments of the BLE audio source device wirelessly coupled to a plurality BLE audio playback devices.

BRIEF DESCRIPTION OF THE DRAWINGS

In the figures and description like reference numerals refer to like features. Embodiments are now described in detail, by way of example only, illustrated by the accompanying drawings in which.

Figure 1A:
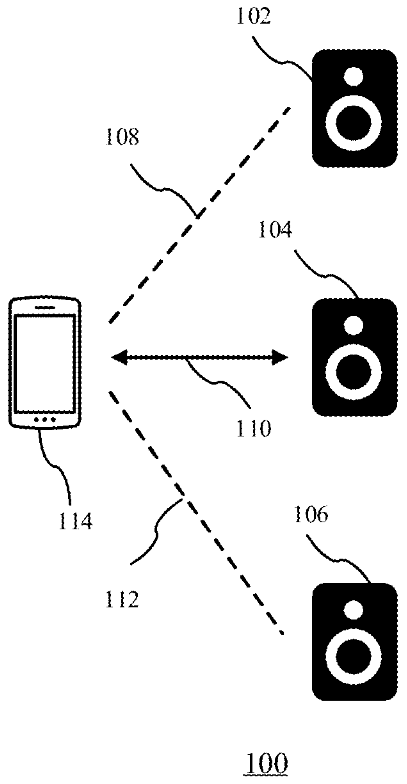
FIGS. 1A, 1B, and 1C shows a BLE system including a BLE audio source device according to an embodiment.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

Figure 1B:
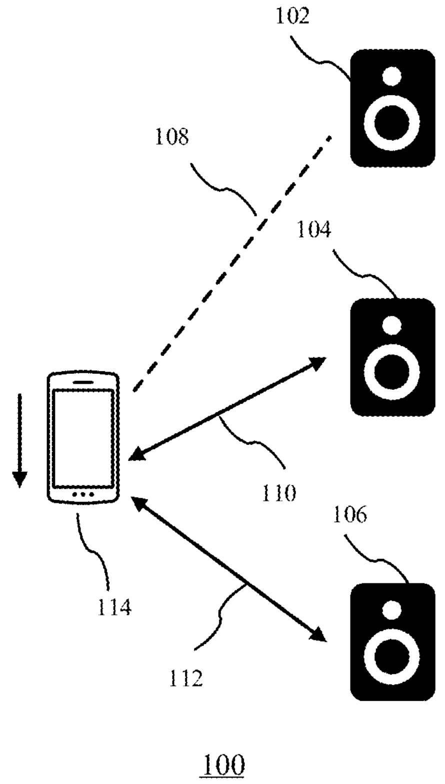
Figure 1C:
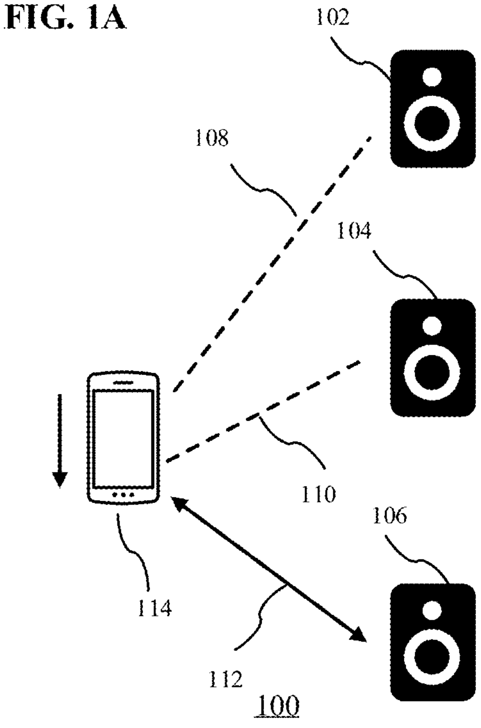

FIGS. 1A, 1B, 1C shows a connection handover event for an audio BLE system 100. The audio BLE system 100 includes an audio source device 114, which as illustrated is a mobile phone, and audio receiver devices 102, 104, 106 which may be BLE loudspeakers. Audio receiver devices may also be referred to herein as BLE audio playback devices. The audio source device 114 has a BLE transceiver (not shown). The audio receiver devices 102, 104, 106 may for example be located in different rooms. In the first scenario showed in FIG. 1A, the audio source device 114 has an active Bluetooth connection 110 to the audio receiver device 104 via the BLE transceiver. The other audio receiver devices 102, 106 are bonded (i.e. wirelessly coupled) with the audio source device 114 and the respective connections 108, 112 are monitored by the audio source device 114. The audio source device 114 may determine a metric for the monitored connections 108, 112. A metric for example may include but is not limited to angle-of-arrival (AoA), received signal strength indication (RSSI), time-of-flight (ToF), and signal-to-noise ratio (SNR) of the active connection signal and bonded connection signal received respectively from the audio receiver devices 102, 106. In FIG. 1B the connection change criteria has been met which may for example be the due to the location of the audio source device 114 changing, for example by the user moving to a different room. As illustrated in FIG. 1B, a connection 112 between the audio source device 114 and audio receiver device 106 becomes a new active connection. The active connection 110 between the audio source device 114 and the audio receiver device 104 remains until the new active connection 112 is established for example by being reported by the Bluetooth software stack via a call-back containing the event information to establish the new connection The term Bluetooth software stack, or Bluetooth stack as used herein may be considered as referring to software that is an implementation of the Bluetooth protocol stack. The information provided in the callback are standardized but the method of implementation may be different. Once the new active connection 112 has been established, the previous active connection 110 is dropped as shown in FIG. 1C. The audio receiver device 104 may remain bonded to the audio source device and the connection 110 can still be monitored.

Figure 2A:
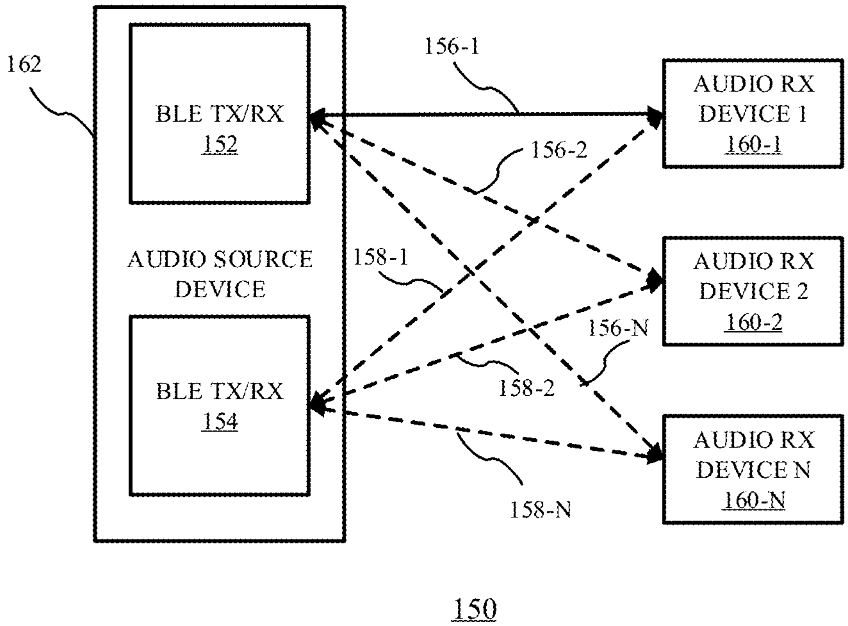
FIGS. 2A, 2B, and 2C shows a BLE audio source device according to an embodiment.
Figure 2B:
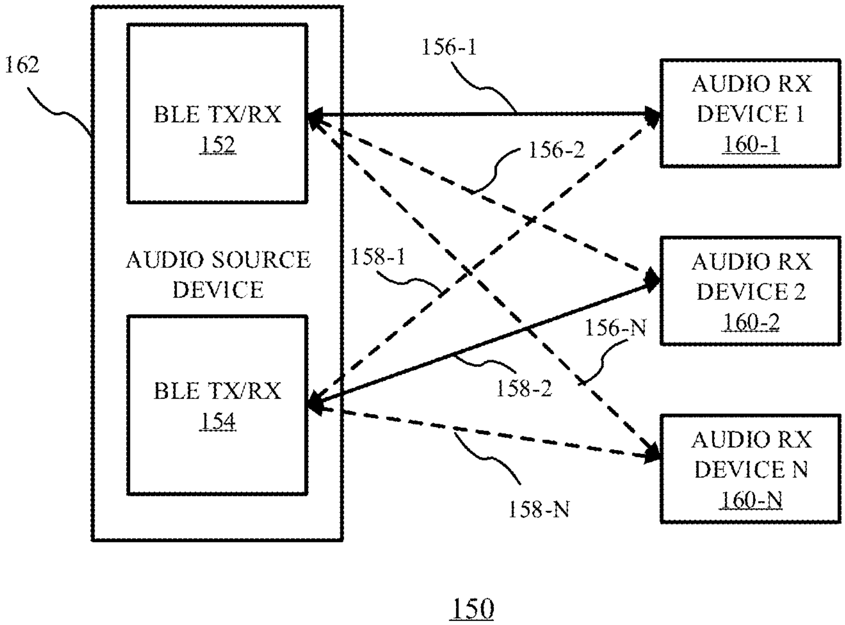
Figure 2C:
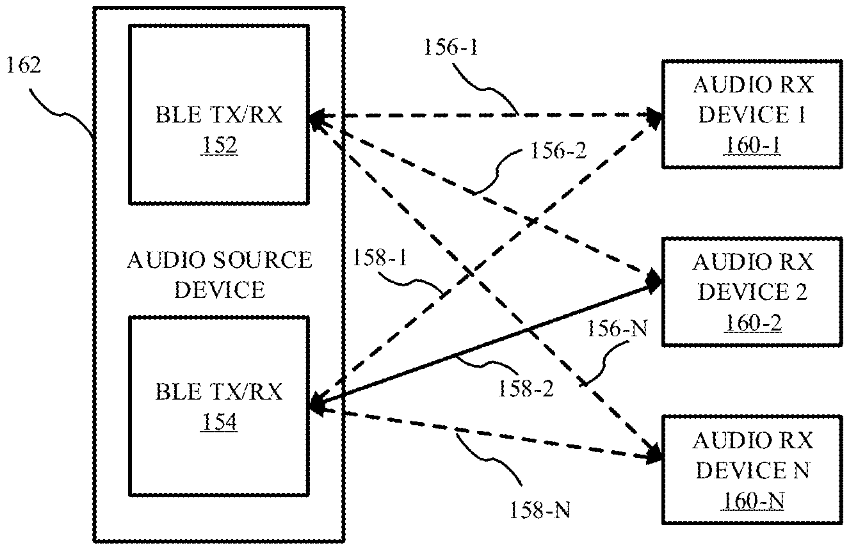

FIGS. 2A, 2B, 2C shows an audio BLE system 150 according to an embodiment in different modes of operation. Referring first to FIG. 2A, a BLE audio source device 162 may have a first BLE transceiver 152 and a second BLE transceiver 154 each having the same Bluetooth device ID. The first BLE transceiver 152 has N connections 156-1, 156-2, 156-N with respective audio receiver devices 160-1, 160-2, 160-N for example loudspeakers or other audio rendering devices. Similarly the second BLE transceiver 154 has N connections 158-1, 158-2, 158-N with respective audio receiver devices 160-1, 160-2, 160-N. As illustrated, the solid line 156-1 denotes the active audio connection. The remaining connections shown as dashed lines are BLE connections which may be monitored by the respective BLE transceiver 152, 154.

In operation the audio source device 162 is connected via Bluetooth LE to at most N audio receiver devices. The audio source device 162 only plays the audio information to the audio receiving device that has the best connection determined from the metric. For example, this may be the connection which has one or more of the highest value of RSSI, the shortest value of ToF, and the highest SNR value which as illustrated is audio receiver device 160-1.

The audio source device 162 may constantly monitor the metrics of the connections 156, 158 and determine which is the next device to be used for rendering audio information. Once the metrics drop under a predefined threshold the connection with the respective audio rendering device may be closed and the device is free to be used by other Bluetooth LE devices.

Figure 3:
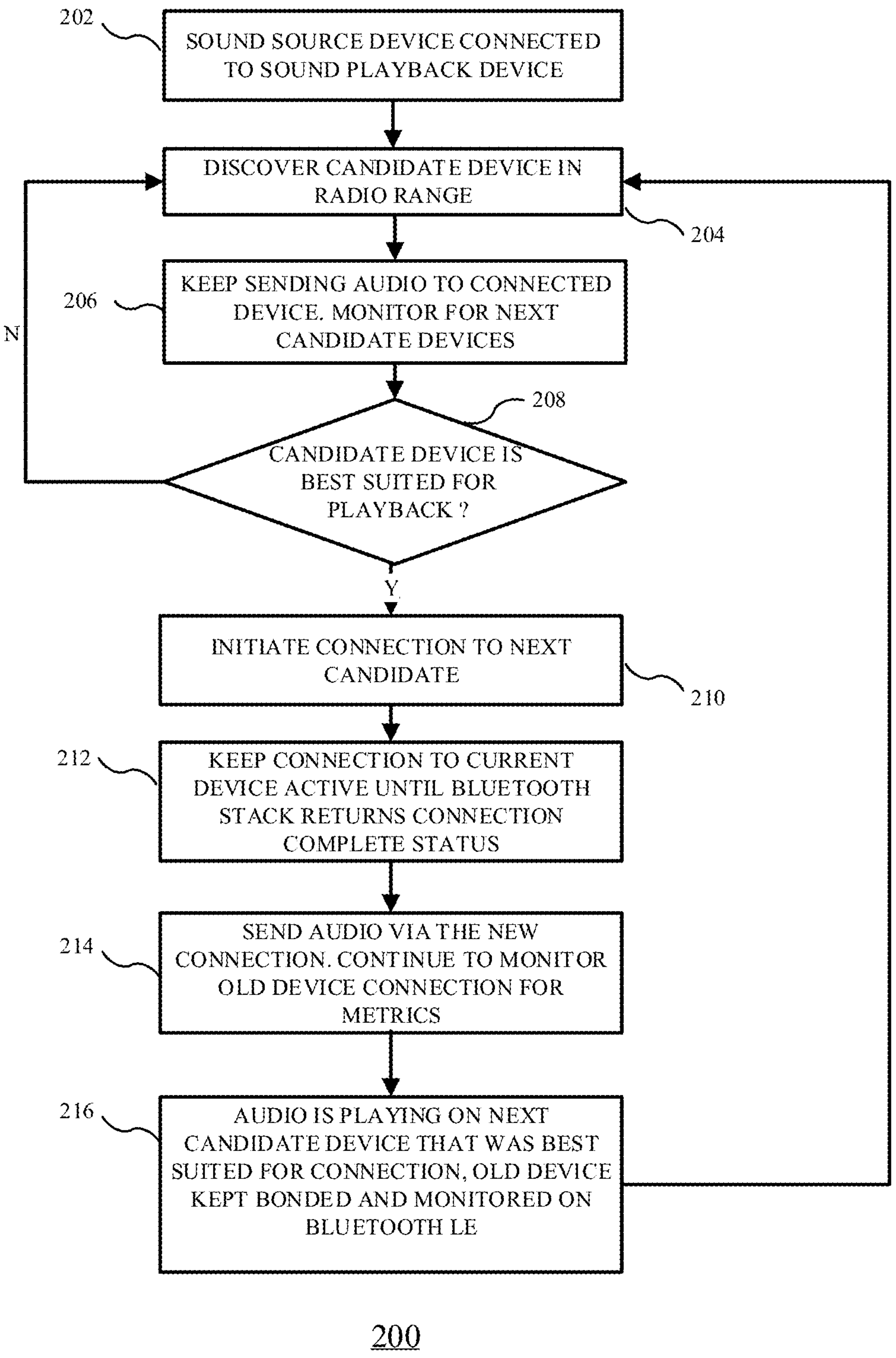
FIG. 3 Shows an audio playback method for a BLE system according to an embodiment.
Figure 4:
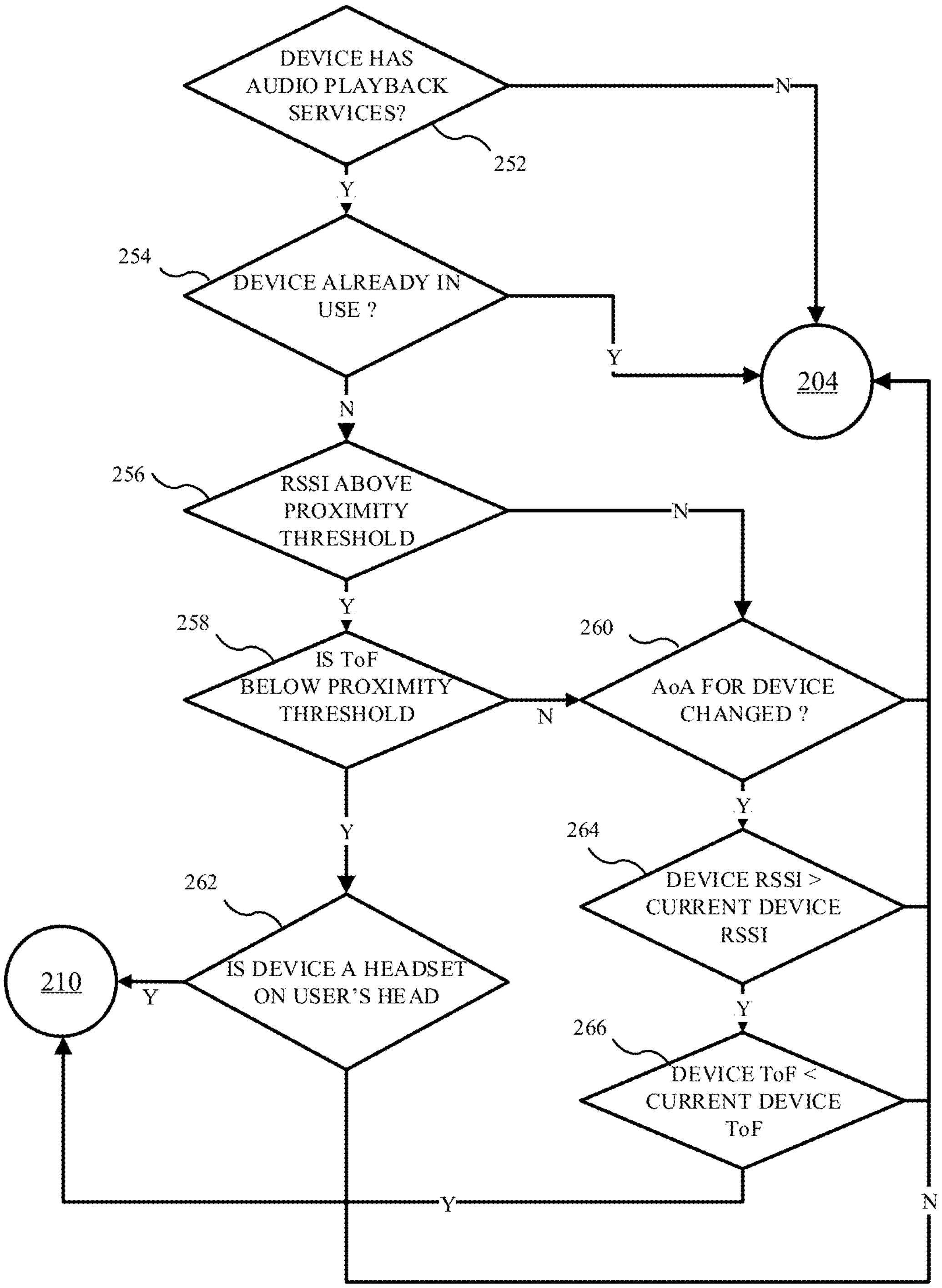
FIG. 4 Shows an audio playback method for a BLE system according to an embodiment.

An example method of operation of the BL audio system is illustrated in FIGS. 3 and 4. FIG. 3 shows a method of audio playback for a BLE system 200 according to an embodiment. In step 202, a sound source device for example audio source device 114, 162 may be connected to sound playback device, for example audio receiver device 160-1, 104. The Sound Source Device has the BLE role of Scanner and connected to a Sound Playback Device which has the BLE Role of Advertiser with Services Advertised including for example 0x110B Audio Sink, 0x1112 Headset-Audio Gateway, 0x111F Hands free Audio Gateway. The sound source device sends audio information such as music or speech. The connection 156-1 may be made using a first BLE transceiver, for example BLE transceiver 152. In step 204 a candidate device, for example audio receiver device 106, 160-2 may be discovered in radio range of the audio source device by detecting advertiser (ADV) packets. In step 206 the audio source device may continue sending data to the connected device while monitoring ADV packets for the next candidate devices. In step 208 the method may determine whether the candidate device is a better candidate for audio playback than the current device. If it is not a better candidate, the method returns to step 204. If the candidate device is better, then in step 210 a connection request is initiated to the next candidate receiver device. This connection may be initiated from the second BLE transceiver, for example BLE transceiver 154. In step 212 the connection to the current receiver device for example connection 156-1 is kept active until the connection complete status (the Bluetooth CONN_COMPLETE event) is received. The audio data is played back simultaneously on both the current BLE audio playback device for example audio receiver 104, 160-1 and the candidate audio receivers 106, 160-2. This status is illustrated for example in FIGS. 1B, 2B for BLE audio systems 100, 150.

In step 214 the audio data is transmitted via the new connection, for example connection 158-2 while the old device connection is monitored for metrics. In step 216 the audio is played on the audio receiver device 160-2 and stopped on audio receiver device 160-1. The old (previous) audio receiver device 160-1 is kept bonded and monitored FIG. 4 shows a method 250 of determining whether a better candidate than the current connection exists which may be used for example to implement step 208 in method 200. In step 252, the method determine if the candidate device has audio playback services. This may be implemented for example by extracting services supported by the Candidate Device from the ADV packet. If neither 0× 110B AudioSink, 0x1112 Headset-Audio Gateway, 0x111F HandsfreeAudioGateway or any other "audio playing services" are detected, the method 250 ends and may return for example to step 204 in method 200. If audio playing services are detected, the method may proceed to step 254 where check is made to determine whether device is already in use. If the device is already in use, the method may end and may return for example to step 204 in method 200. Otherwise, from step 254 the method may proceed to step 256 where a comparison is made between the RSSI and a RSSI proximity threshold value which may be for example above −50 dBm. If the RSSI is not above the RSSI proximity threshold value the method proceeds to step 260. If the RSSI is above the RSSI proximity threshold value the method proceeds to step 258 where a comparison is made between the ToF and a ToF proximity threshold value which may be 200 μs. If the time-of-flight is not below the proximity threshold, the method proceeds to step 260. Otherwise in step 262, the method determines whether the device is a headset is on the user's head for example through sensors available on the headset. If the headset is on the user's head, the method proceeds to initiate a new connection for example step 204 in method 200. Otherwise, the method 250 ends and may return for example to step 204 in method 200.

Returning to step 260, the method checks whether the angle of arrival for the device has changed. If it has not changed, the method 250 ends and may return for example to step 204 in method 200. Otherwise from step 260, the method proceeds to step 264 and checks whether the device RSSI is greater than the current device RSSI. If the device RSSI is not greater than the current device RSSI, the method 250 ends and may return for example to step 204 in method 200. Otherwise from step 264, the method proceeds to step 266 and checks whether the device time-of-flight (ToF) is less than the current device ToF. If the device ToF is not less than the current device ToF, the method 250 ends and may return for example to step 204 in method 200. Otherwise from step 26, the method proceeds to initiate a new connection for example step 210 in method 200. Checking the angle of arrival may detect when the user is in between two playback devices. Even if the proximity threshold is not met in steps 254,258, determining the movement of the user using the angle of arrival may indicate a potential switch to a new playback device which is then initiated dependent on RSSI and ToF metrics.

Embodiments of the disclosure propose a method to switch audio streams between audio playback devices automatically without any perceived audio sound loss. Touchless handover refers to the fact that the switching action happens between two transceivers: one is sending the audio playback, the other transceiver is used for scanning without any type of user intervention using a human machine interface (HMI) such as a button, touch element. Switching between the two transceivers is taken: when a decision is taken when the underlying stack signals connection complete. When the switching between the two transceivers happens, the previous connection is severed, but the device is kept into the bonding table and monitored by the scanning transceiver While living in multi-room housing/apartment, it is cumbersome to manually select the playing device for audio information. Embodiments of the BLE system and method allow rendering the audio stream on the audio playback-enabled device that is closer to the audio source device. Embodiments described herein may use the BLE connections mechanism (acquire/release) for selecting the next device to be used for audio rendering. This implies that the audio source device has (at least) two radio transceivers, which allow it to "talk" to N devices, as if they're separate devices. One of the radio transceivers keeps the connection active, while the second transceiver may implement the method presented herein. Methods may use the Bluetooth LE algorithm which allows up to N audio rendering devices also referred to as audio playback devices be connected to an audio playing device which manages the connections and selects which rendering device receives the audio stream.

An audio playback method for a Bluetooth low energy (BLE) system is described. The BLE system includes at least two BLE audio playback devices configured to be bonded to a BLE audio source device having two BLE transceivers. A first BLE audio playback device of the plurality of BLE audio playback devices may initially have an active connection to the BLE audio source device. The method includes sending audio data from the BLE audio source device to the first BLE audio playback device. A metric of an active connection signal and a bonded connection signal is determined. The method determines whether a second BLE audio playback device is a better candidate for audio playback than the first BLE audio playback device depending on at least the bonded connection signal metric. If it is a better candidate, the active connection is handed over to the second BLE audio playback device.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. An audio playback method for a Bluetooth low energy (BLE) system comprising a BLE audio source device having at least two BLE transceivers, a plurality of BLE audio playback devices configured to be bonded to the BLE audio source device, a first BLE audio playback device of the plurality of BLE audio playback devices configured to initially have an active connection to the BLE audio source device, the method comprising:
- sending audio data from the BLE audio source device to the first BLE audio playback device;
- determining a metric of an active connection signal transmitted from the first BLE audio playback device to the BLE audio source device;
- determining a metric of a bonded connection signal transmitted from a second BLE audio playback device of the plurality of BLE audio playback devices to the BLE audio source device;
- determining whether to handover the active connection to the second BLE audio playback device depending on at least the bonded connection signal metric; and
- in response to determining to handover the active connection to the second BLE audio playback:
  - handing over the active connection to the second BLE audio playback device by:
    - initiating a connection request to the second BLE audio playback device;
    - sending audio data to the second BLE audio playback device while simultaneously sending data to the first BLE audio playback device; and
    - in response to a connection complete status, stopping sending audio data to the first BLE audio playback device.

2. The audio playback method of claim 1, wherein the BLE audio source device is configured as a scanner, the first and second BLE audio playback devices are configured to transmit advertiser (ADV) packets, and wherein the method further comprises:
- receiving the ADV packets by the BLE audio source device from the first and second BLE audio playback devices; and
- the BLE audio source device determining the active connection signal metric and the bonded connection signal metric from the ADV packets.

3. The audio playback method of claim 1, wherein determining the active connection signal metric and the bonded connection signal metric comprises determining a received signal strength indication (RSSI) of the respective connection signal.

4. The audio playback method of claim 3, wherein determining whether to handover the active connection to the second BLE audio playback device further comprises:
comparing a bonded connection signal RSSI to a RSSI proximity threshold value; and
determining that the second BLE audio playback device is a better candidate for audio playback than the first BLE audio playback device if the bonded connection signal RSSI is above the RSSI proximity threshold value.

5. The audio playback method of claim 3, wherein determining the active connection signal metric and the bonded connection signal metric comprises determining a time-of-flight ToF of the respective connection signal.

6. The audio playback method of claim 5, wherein determining whether to handover the active connection to the second BLE audio playback device further comprises:
comparing a bonded connection signal ToF to a ToF proximity threshold value; and
determining that the second BLE audio playback device is a better candidate for audio playback than the first BLE audio playback device if the bonded connection signal ToF is less than the ToF proximity threshold value.

7. The audio playback method of claim 4, wherein determining the active connection signal metric and the bonded connection signal metric comprises determining an angle-of-arrival of the respective connection signal.

8. The audio playback method of claim 7, wherein determining whether to handover the active connection to the second BLE audio playback device further comprises:
detecting a change in the angle-of-arrival of the bonded connection signal in response to at least one of the bonded connection signal RSSI being less than the RSSI proximity threshold value and a bonded connection signal ToF being greater than a ToF proximity threshold value.

9. The audio playback method of claim 8, wherein determining whether to handover the active connection to the second BLE audio playback device further comprises:
comparing the bonded connection signal RSSI with the active connection signal RSSI.

10. The audio playback method of claim 8, wherein determining whether to handover the active connection to the second BLE audio playback device further comprises:
comparing the bonded connection signal ToF with the active connection signal ToF.

11. The audio playback method of claim 3, wherein determining the active connection signal metric and the bonded connection signal metric comprises determining a signal-to-noise ratio SNR of the respective connection signal.

12. A Bluetooth low energy BLE audio source device comprising two BLE transceivers and configured to be bonded to a plurality BLE audio playback devices, and to initially have an active connection to a first BLE audio playback device of a plurality of BLE audio playback, BLE audio source device configured to:
send audio data to the first BLE audio playback device;
determine a metric of an active connection signal received from the first BLE audio playback device;
determine a metric of a bonded connection signal received from a second BLE audio playback device of the plurality of BLE audio playback devices;
determine whether to handover the active connection to the second BLE audio playback device depending on at least the bonded connection signal metric; and
in response to determining to handover the active connection to the second BLE audio playback device, the BLE audio source device is further configured to hand over the active connection to the second BLE audio playback device by:
initiating a connection request to the second BLE audio playback device;
sending audio data to the second BLE audio playback device while simultaneously sending data to the first audio device; and
in response to a connection complete signal, stopping sending audio data to the first BLE audio playback device.

13. The BLE audio source device of claim 12 further configured to:
receive advertiser ADV packets from the first and second BLE audio playback devices; and
determine the active connection signal metric and the bonded connection signal metric from the ADV packets.

14. The BLE audio source device of claim 12, wherein the active connection signal metric and the bonded connection signal metric comprises at least one of a received signal strength indication (RSSI), a time-of-flight (ToF), an angle-of-arrival, and a signal to noise ratio (SNR) of the respective connection signal.

15. The BLE audio source device of claim 14, further configured to determine whether to handover the active connection to the second BLE audio playback device by comparing a bonded connection signal RSSI to a RSSI proximity threshold value; and further configured to determine that the second BLE audio playback device is a better candidate for audio playback than the first BLE audio playback device if the bonded connection signal RSSI is above the RSSI proximity threshold value.

16. The VLE audio device of claim 14, further configured to determine whether to handover the active connection to the second BLE audio playback device by comparing a bonded connection signal time-of-flight (ToF) to a ToF proximity threshold value; and further configured to determine that the second BLE audio playback device is a better candidate for audio playback than the first BLE audio playback device if the bonded connection signal ToF is less than the ToF proximity threshold value.

17. The BLE audio source device of claim 14, further configured to determine whether to handover the active connection to the second BLE audio playback device by:
detecting a change in the angle-of-arrival of the bonded connection signal in response to at least one of a bonded connection signal RSSI being less than a RSSI proximity threshold value and a bonded connection signal ToF being greater than a ToF proximity threshold value.

18. The BLE audio source device of claim 14, further configured to determine whether to handover the active connection to the second BLE audio playback device by:
comparing a bonded connection signal RSSI with an active connection signal RSSI.

19. The BLE audio source device of claim 14, further configured to determine whether to handover the active connection to the second BLE audio playback device by:
comparing a bonded connection signal ToF with an active connection signal ToF.

20. A BLE audio system comprising the BLE audio source device of claim 14 wirelessly coupled to a plurality BLE audio playback devices.

* * * * *